US006831384B2

United States Patent
Ries et al.

(10) Patent No.: US 6,831,384 B2
(45) Date of Patent: Dec. 14, 2004

(54) MAGNETIC BEARING

(75) Inventors: Günter Ries, Erlangen (DE); Florian Steinmeyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/381,463

(22) PCT Filed: Sep. 14, 2001

(86) PCT No.: PCT/DE01/03539

§ 371 (c)(1),
(2), (4) Date: Mar. 26, 2003

(87) PCT Pub. No.: WO02/27204

PCT Pub. Date: Apr. 4, 2002

(65) Prior Publication Data

US 2004/0075355 A1 Apr. 22, 2004

(30) Foreign Application Priority Data

Sep. 26, 2000 (DE) .......................... 100 47 583

(51) Int. Cl.[7] .............................. F16C 39/06; H02K 7/09
(52) U.S. Cl. ..................................................... 310/90.5
(58) Field of Search ........................................ 310/90.5

(56) References Cited

U.S. PATENT DOCUMENTS

| | | | | |
|---|---|---|---|---|
| 3,888,553 A | * | 6/1975 | Wehde ........................ | 310/90.5 |
| 4,072,370 A | * | 2/1978 | Wasson ...................... | 310/90.5 |
| 4,888,512 A | * | 12/1989 | Shimizu ................... | 310/156.43 |
| 4,983,869 A | * | 1/1991 | Vaidya et al. .............. | 310/90.5 |
| 5,196,748 A | * | 3/1993 | Rigney ....................... | 310/90.5 |
| 5,633,548 A | | 5/1997 | Takahata et al. ........... | 310/90.5 |
| 5,640,887 A | | 6/1997 | Hull et al. .................. | 310/90.5 |
| 5,710,469 A | * | 1/1998 | Ries ........................... | 310/90.5 |
| 5,763,971 A | * | 6/1998 | Takahata et al. ........... | 310/90.5 |

FOREIGN PATENT DOCUMENTS

| | | | | |
|---|---|---|---|---|
| DE | 44 36 831 | 6/1995 | ........... | F16C/32/04 |
| EP | 0 413 851 | 9/1989 | ........... | F16C/39/06 |
| EP | 0 728 956 | 8/1996 | ........... | F16C/39/06 |
| JP | 8-200368 | 8/1996 | ........... | F16C/32/04 |
| JP | 9-049523 | 2/1997 | ........... | F16C/33/04 |

OTHER PUBLICATIONS

Murakami, "Processing of bulk YbaCuO" Supercond. Sci. Technol., 5, 1992, pp. 185–203.

Lee, "Hot–pressed neodymium–iron–boron magnets", Appl. Phys. Lett., 5, 1985, pp. 790–791.

Heisz et al., "Isotropic and anisotropic Nd–Fe–B–type magnets by mechanical alloying and hot pressing", Appl. Phys. Lett., 53, 1988, pp. 342–343.

* cited by examiner

Primary Examiner—Burton Mullins
(74) Attorney, Agent, or Firm—Staas & Halsey LLP

(57) ABSTRACT

A magnetic bearing includes at least one inner bearing part; at least one outer bearing part which surrounds the inner bearing part; at least one permanent magnet and at least one flux guiding element which is positioned axially in relation to a rotation axis, adjacent to the permanent magnet(s), for guiding the magnetic flux of the permanent magnet(s) to one of the two bearing parts, and at least one superconductor on the other of the two bearing parts. The permanent magnet(s) and superconductor interact with each other in such a way that a bearing gap is formed around the rotation axis between the inner bearing part and the outer bearing part. The permanent magnet(s) is/are radially set back towards the bearing gap in relation to the flux guiding element(s) in a radial direction, perpendicular to the rotation axis. Each permanent magnet is held at least one of inwards and outwards by a corresponding radial holding element, at least on the facing towards the bearing gap.

5 Claims, 2 Drawing Sheets

MAGNETIC BEARING

CROSS REFERENCE TO RELATED APPLICATIONS

This application is based on and hereby claims priority to German Application No. 100 47 583.3 filed on Sep. 26, 2000, the contents of which are hereby incorporated by reference.

BACKGROUND OF THE INVENTION

1. Field of the Invention

The invention relates to a magnetic bearing.

2. Description of the Related Art

Magnetic bearings allow moving parts to be mounted free from any contact or wear. They therefore do not require any lubricants and can be of a low-friction design. What are known as active magnetic bearings, with electromagnets, require an active position control, which controls the currents of the supporting magnets and counteracts deviations of the rotor body from its intended position by position sensors and a control loop. What are known as passive magnetic bearings, on the other hand, stabilize their position by themselves, so that no active position control is necessary.

U.S. Pat. No. 4,072,370 A discloses a passive magnetic bearing with an arrangement of permanent magnets both on the stator and on the rotor.

Furthermore, there are known passive magnetic bearings in which only one of the bearing parts is formed by permanent-magnetic elements and the other bearing part includes a superconductor. The permanent-magnetic elements induce shielding currents when there is a change in position, as a consequence of changes in the field in the superconductor. The resulting forces may be repelling or attracting, but are always directed in such a way that they counteract the deflection from the intended position. Consequently, an inherently stable bearing can be achieved and it is possible to dispense with a complex and fault-susceptible control. However, cooling of the superconductor material is required. Magnetic bearings with superconductors are described, for example, in U.S. Pat. No. 5,196,748 A and EP 0 322 693 A.

DE 44 36 831 C2 then discloses a further passive magnetic bearing with a high-temperature superconductor. This known magnetic bearing includes a first bearing part, which is connected to a rotor shaft, and a second bearing part, which is arranged on a stator and surrounds the first bearing part. One of the two bearing parts has the high-temperature superconductor. The other bearing part includes an arrangement of permanent-magnetic elements arranged adjacent to one another. The magnetization of neighboring permanent-magnetic elements is opposite to one another. The interspaces between respective pairs of permanent-magnetic elements are filled with ferromagnetic material to concentrate the magnetic flux emerging from the permanent-magnetic elements on the side facing the other bearing part. As a result, great bearing rigidity (stability) is obtained.

In a configuration according to DE 44 36 831 C1, the permanent magnets are provided in a hollow-cylindrical arrangement on the inner bearing part and the superconductor is arranged as a hollow-cylindrical structure on the inner side of a hollow-cylindrical support body of the outer bearing part. Cooling channels for passing through liquid nitrogen are formed in the support body to cool the superconductor. In another configuration, the high-temperature superconductor is arranged on the inner bearing part on the rotor shaft, a cooling channel being provided in the rotor shaft for the liquid nitrogen to cool the high-temperature superconductor. The permanent-magnetic elements with the ferromagnetic intermediate elements may be axially arranged in relation to the rotor shaft one behind the other in the form of thin rings or else be axially stretched out and arranged one behind the other in the circumferential direction, respectively with alternating magnetization.

In DE 44 36 831 C2, a material with an energy product $(B*H)_{max}$ of at least 20 MGOe, in particular a neodymium (Nd)-iron(Fe)-boron(B) alloy or a samarium (Sm)-cobalt (Co) alloy, is proposed as the permanent-magnetic material. The permanent-magnetic material may also be cooled to increase its coercive field strength.

The permanent-magnetic materials used in the known magnetic bearings to achieve the high magnetic fields are themselves exposed to considerable forces by the high magnetic fields. With the permanent magnets arranged on the rotating bearing part, centrifugal forces additionally act on the permanent magnets. These forces may then lead to the detachment of individual magnetic particles, in particular from the brittle permanent magnets produced power-metallurgically by sintering or pressing, or even to the rupture of the permanent magnets, in particular in the case of permanent loading and material fatigue. This can, however, bring about considerable damage or even complete destruction of the magnetic bearing.

EP 0 728 956 A1 then discloses a magnetic bearing with a superconductor on the stator and an arrangement of permanent magnets on the rotor and also a bearing gap between the superconductor and the permanent magnets. The permanent magnets are formed in an annular manner and arranged concentrically in relation to the axis of rotation of the rotor. Annular, soft-magnetic flux guiding elements are provided between the individual annular permanent magnets. The annular permanent magnets, on the other hand, are formed from a magnetic sintered material with a high energy product, in particular a samarium-cobalt or a neodymium-iron-boron magnetic material. In order to prevent a rupture of these sintered permanent magnets, in particular at high rotational speeds, a reinforcing ring of a glass-fiber or synthetic-fiber reinforced plastic is then arranged around the outermost ring of the arrangement of magnets and radially holds the arrangement of the annular permanent magnets together under a radial pressure.

A similar arrangement is also known from Patent Abstracts of Japan with respect to JP 09 049 523 A.

EP 0 413 851 A1 discloses a bearing ring for magnetic bearings for use in magnet-mounted vacuum pumps with arrangements of permanent magnets on the rotor and the stator. Iron-neodymium-boron magnets or cobalt-samarium magnets are proposed as permanent magnets. This known magnetic bearing includes, on the rotating shaft, bearing rings which respectively include a hub ring, a ring of permanent magnets and a reinforcing ring. The reinforcing rings have the task of avoiding destruction of the permanent rings being caused by the high centrifugal forces and preferably are formed of high-grade steel.

Patent Abstracts of Japan with respect to JP 08 200 368 A further discloses a magnetic bearing with a superconductor on the outer-lying stator and an arrangement of permanent magnets on the inner-lying rotor. The arrangement of permanent magnets includes a number of permanent magnets in the form of segments of a ring lying adjacent to one another in the circumferential direction and combining with one another to form a closed ring. Arranged around the outer periphery of all the ring-segment-like permanent magnets is a holding ring, to avoid the permanent magnets being ruptured by the great centrifugal forces at high rotational speeds. Also provided is a thrust ring, which presses the holding ring radially inward against the outer faces of the permanent magnets. The permanent magnets are not spaced apart from one another but touch one another. Flux guiding elements are not provided between the permanent magnets.

In the case of known magnetic bearings in which radial holding devices are provided for the permanent magnets, however, the supporting forces of the bearing or the load-bearing capacity of the bearing are reduced. This is because, in the case of the known magnetic bearings, the radial holding devices are arranged between the permanent magnets and the associated flux guiding elements, if any, on the one hand and the bearing gap on the other hand and, as a result, reduce the magnetic flux density effective in the bearing gap and with the superconductor, since the bearing gap must not become less than a specific minimum width.

SUMMARY OF THE INVENTION

The invention is therefore based on an object of protecting the magnetic bearing from destruction or damage of the permanent magnets, without significantly lessening the supporting force of the bearing.

The magnetic bearing preferably includes at least one inner bearing part and at least one outer bearing part, which surrounds the inner bearing part. Arranged on one of the two bearing parts are at least one permanent magnet, in particular of hard-magnetic material, and at least one flux guiding element to guide the magnetic flux of the permanent magnet. The flux guiding element is arranged axially (or: parallel) in relation to the axis of rotation adjacent (or: offset in relation) to the permanent magnet, and generally is formed of magnetically conducting, in particular soft-magnetic and/or ferromagnetic, material. Arranged on the other of the two bearing parts, on the other hand, is at least one structure (coupling or interacting means) which interacts (magnetically) with the permanent magnet or magnets in such a way that a bearing gap (bearing distance, bearing interspace) which runs around the axis of rotation can be or is formed between the inner bearing part and the outer bearing part, so that contact-free rotation of the two bearing parts with respect to each other about an axis of rotation is possible.

A radial holding device (protective device, shielding device) holds and stabilizes the permanent magnet in at least one radial direction perpendicularly in relation to the axis of rotation, but at least toward the bearing gap, and as a result stops the permanent magnet or fragments of the permanent magnet from moving in this radial direction toward the bearing gap. Consequently, the permanent magnet is shielded from the bearing gap by the radial holding device and, as a result, can no longer shed any fragments or particles in this radial direction. Consequently, the permanent magnet can no longer cause any damage to the magnetic bearing even under the influence of strong forces, in particular as a result of high magnetic fields or high centrifugal forces, and a disintegration or detachment of particles possible as a result.

In order not to reduce the supporting force of the magnetic bearing, as further measures, on the one hand each permanent magnet is expanded less far in the radial direction, at least toward the bearing gap, than the flux guiding element or elements and on the other hand the radial holding device is formed with in each case a single holding element for each permanent magnet.

According to the invention, consequently, the radial holding device is arranged between the bearing gap and the permanent magnet and consequently the particularly trouble-prone region of the bearing gap is protected from fragments and detached parts of the permanent magnet by the radial holding device. Each flux guiding element serves for guiding the magnetic flux of the permanent magnets and generally also for concentrating and intensifying it in the bearing gap. The supporting force of the bearing is only slightly affected by the holding device according to the invention. This is because, on the one hand, the permanent magnets are set back, and consequently the holding elements do not protrude, or only little, into the bearing gap, so that the bearing gap therefore does not have to be chosen to be any larger. On the other hand, the flux guiding elements also guide the magnetic flux of the set-back permanent magnets still with virtually the same intensity toward the bearing gap. The supporting force of the bearing is then produced predominantly in the region of the high magnetic flux density and magnetic flux density gradient radially outside on the flux guiding elements. The radial holding device provided in the region of the permanent magnet or magnets does not disturb the magnetic flux at these points of emergence on the flux guiding elements. The invention is in this respect also based on the consideration that it is possible to dispense with stabilization of the flux guiding elements, because the flux guiding elements can be configured to be mechanically more stable than the permanent magnets.

The magnetic bearing according to the invention is generally intended for a body (rotor) which is rotatable or rotates about an axis of rotation. For this purpose, the inner bearing part or the outer bearing part is or can be connected to the rotor.

In a first embodiment, the radial holding device is arranged on an outer side of the permanent magnet, facing away from the axis of rotation, and, as a result, prevents parts of the permanent magnet from escaping in the outwardly directed radial direction. This prevention of movement of the permanent magnet and fragments thereof, at least in the outwardly directed radial direction, by the radial holding device is particularly expedient in the case of an embodiment of the magnetic bearing in which at least one permanent magnet is provided on the rotatable or rotating bearing part or the bearing part which is connected or can be connected to the rotor. This is because, as a result of the rotation of the bearing part and of the permanent magnet located on it, centrifugal forces which are all the greater the faster the bearing part rotates act on the permanent magnet in the outwardly directed radial direction. The radial holding device then holds the permanent magnet, at least in this critical direction of the centrifugal forces. As a result, centrifugal forces in the rotating permanent magnet are also intercepted in the outward direction and any detachment of magnetic particles in the outward direction is avoided.

In a second embodiment, the radial holding device is arranged on an inner side of the permanent magnet, facing the axis of rotation, and, as a result, prevents parts of the permanent magnet from escaping in the inwardly directed radial direction. This is of advantage, for example, if the permanent magnet is arranged on the outer bearing part, in order to protect the bearing gap and the inner bearing part from fragments of the permanent magnet. This second embodiment may also be combined with the aforementioned first embodiment.

In an advantageous embodiment, the radial holding device bears with positive and/or nonpositive engagement against the permanent magnet, at least in a subregion, so that in particular interspaces are avoided and the permanent magnet is held mechanically together and thereby stabilized.

The radial holding device may be formed at least partly by a flexible (bendable) material and can then be easily adapted to differently shaped permanent magnets and bearing parts. At least one holding element of the radial holding device is preferably formed in a strip-shaped manner and in this case generally with its broad side toward the permanent magnet.

The radial holding device may, however, also be formed at least partly by a dimensionally stable (rigid) material.

The material of the radial holding device is generally mechanically stable, resistant to tension and tearing and preferably non-magnetic, in order to lessen the supporting force of the bearing as little as possible or not at all. Preferred materials for the radial holding device are fiber materials or fiber composites. Plastics reinforced with carbon fiber or glass fiber or mineral fiber (polymer materials), woven, knitted or laid fiber fabrics or scrims or pressed fiber materials come into consideration in particular. Furthermore, unmagnetic metals or metal alloys, for example unmagnetic steels, are also suitable.

In an advantageous embodiment, the magnetic bearing includes a number of permanent magnets arranged axially in relation to the axis of rotation (or: in the form of a stack) adjacent to one another on one of the bearing parts. The permanent magnets may, however, also be arranged adjacent to one another in an arrangement running around the axis of rotation, in particular in the circumferential direction. Respectively arranged between at least two of the permanent magnets and/or on the outside of the outer permanent magnets in the axial direction, there is then a flux guiding element. The magnetization of the permanent magnets preferably alternates, that is to say the magnetization of two adjacent permanent magnets has opposite polarity.

In a development, a common holding element may extend over the individual holding elements for the permanent magnets and over the flux guiding elements to provide additional reinforcement.

Furthermore, in an advantageous configuration, at least one radial holding element runs around the axis of rotation in one or more layers, that is to say forms a closed hollow-cylindrical, annular, swirl-shaped or loop-shaped form around the axis of rotation.

The radial thickness (expanse) of the radial holding element or elements, measured from the permanent magnet in the radial direction under consideration, is generally at most one third ($1/3$), in particular at most one quarter ($1/4$) and preferably at most one tenth ($1/10$) of the radial thickness of the permanent magnet. Furthermore, the radial expanse of each radial holding element is preferably also chosen to be less than the radial dimension (gap width) of the bearing gap.

The radial expanse of the radial holding element or elements is preferably also chosen such that it does not significantly exceed the difference between the radial expanse of the flux guiding element or elements protruding further outward, on the one hand, and the radial expanse of the permanent magnet or magnets, on the other hand, and is preferably less than or at most equal to this difference. This allows the bearing gap to remain small and it is limited in its radial dimensions only by the flux guiding elements. The holding elements and the flux guiding elements may end flush with one another, in particular in the radial direction, so that there is formed a substantially smooth, preferably cylindrical, common surface, which bounds the bearing gap.

Since each permanent magnet of the magnetic bearing is stabilized by the associated radial holding element, each permanent magnet may be formed of a brittle material, in particular a sintered or pressed molding, or even not be dimensionally stable at all, in particular be formed from magnetic powder. This allows the magnetic materials neodymium(Nd)-iron(Fe)-boron(B) alloy or samarium(Sm)-cobalt(Co) alloy to be used without the risk of mechanical damage to the bearing.

In an advantageous configuration, the permanent magnet or magnets and/or the flux guiding element or elements and/or the holding element or elements and/or the coupling means surround the axis of rotation in a form which is closed (all around), preferably in the form of a ring. The ring cross section may in this case be, in particular, circular, disk-shaped or rectangular, in a way corresponding to a hollow-cylindrical or toroidal ring form. Consequently, the longitudinal section of the ring perpendicular to the axis of rotation may in particular be shaped in the manner of a circular ring.

The radially inner- or outer-lying outer side of at least one permanent magnet and/or of the associated radial holding device is preferably substantially cylindrically shaped, so that a generated surface of a cylinder is obtained on the outer side of this permanent magnet or an arrangement of a number of such permanent magnets or the radial holding device arranged on it. The outer side of at least one permanent magnet and/or of the associated radial holding device may, however, also rise up, in particular in one direction, for example axially and/or conically. Preferably, the radial holding device is adapted to the outer form of the permanent magnets.

A particularly advantageous configuration of the magnetic bearing is distinguished by the fact that a superconducting structure, which preferably includes a high-temperature superconductor, that is to say a superconductor of which the critical temperature lies above 77 K, is provided as the coupling means. However, electromagnets, which inductively generate a magnetic field, or permanent magnets may also be used as the coupling means. In particular in the case of electromagnets, an automatic position control is then also generally provided.

Furthermore, it is advantageous to arrange the coupling means on the side of the bearing part facing the bearing gap, in order to achieve good efficiency of the coupling.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
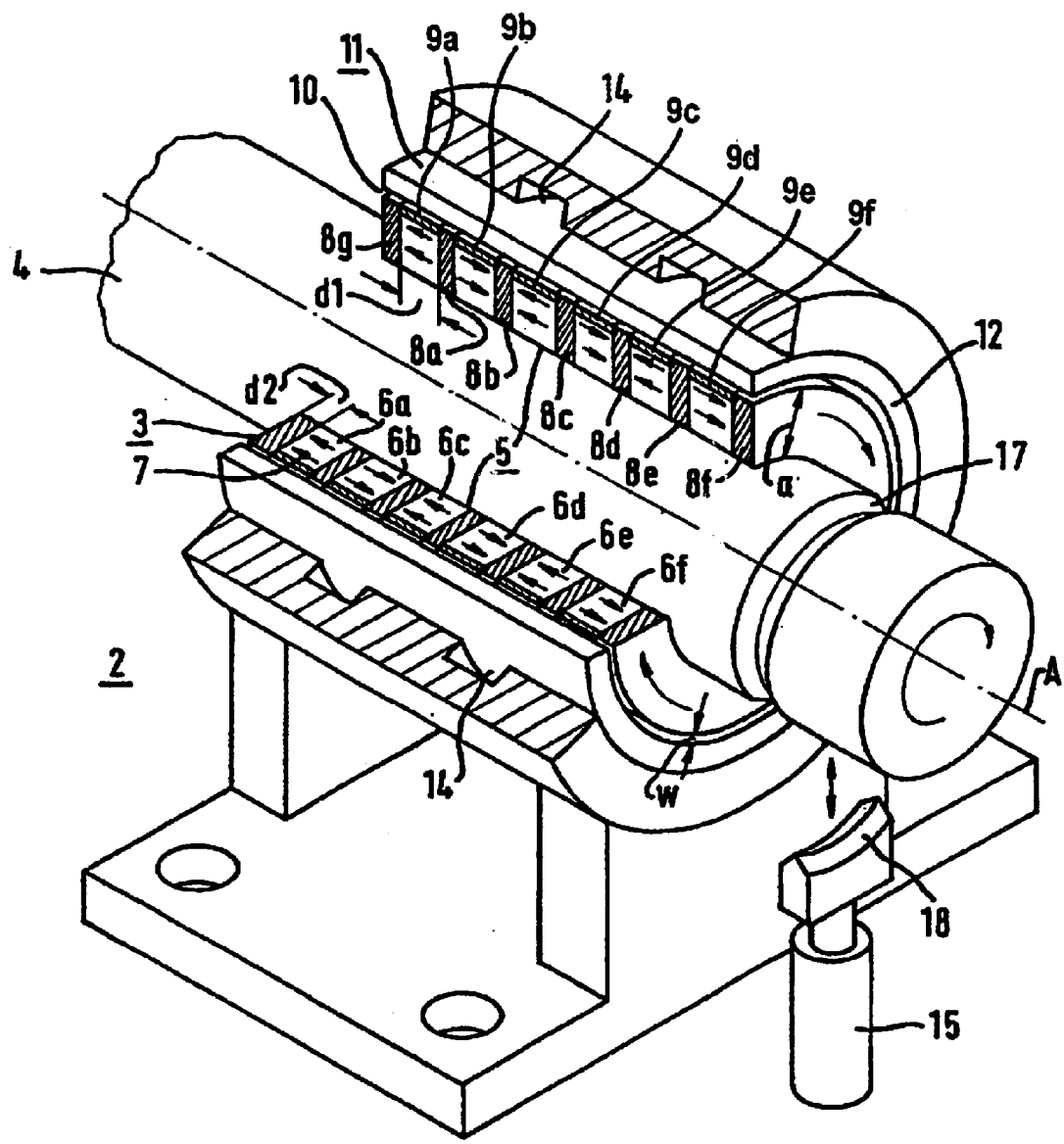
FIG. 1 is a perspective view of a magnetic bearing with individual bandings for axially arranged permanent magnets in a perspective and partially sectioned view and FIG. 2 is a perspective view of a magnetic bearing with individual bandings and a common banding for axially arranged permanent magnets in a perspective and partially sectioned view.

Reference will now be made in detail to the preferred embodiments of the present invention, examples of which are illustrated in the accompanying drawings, wherein like reference numerals refer to like elements throughout.

Figure 2:
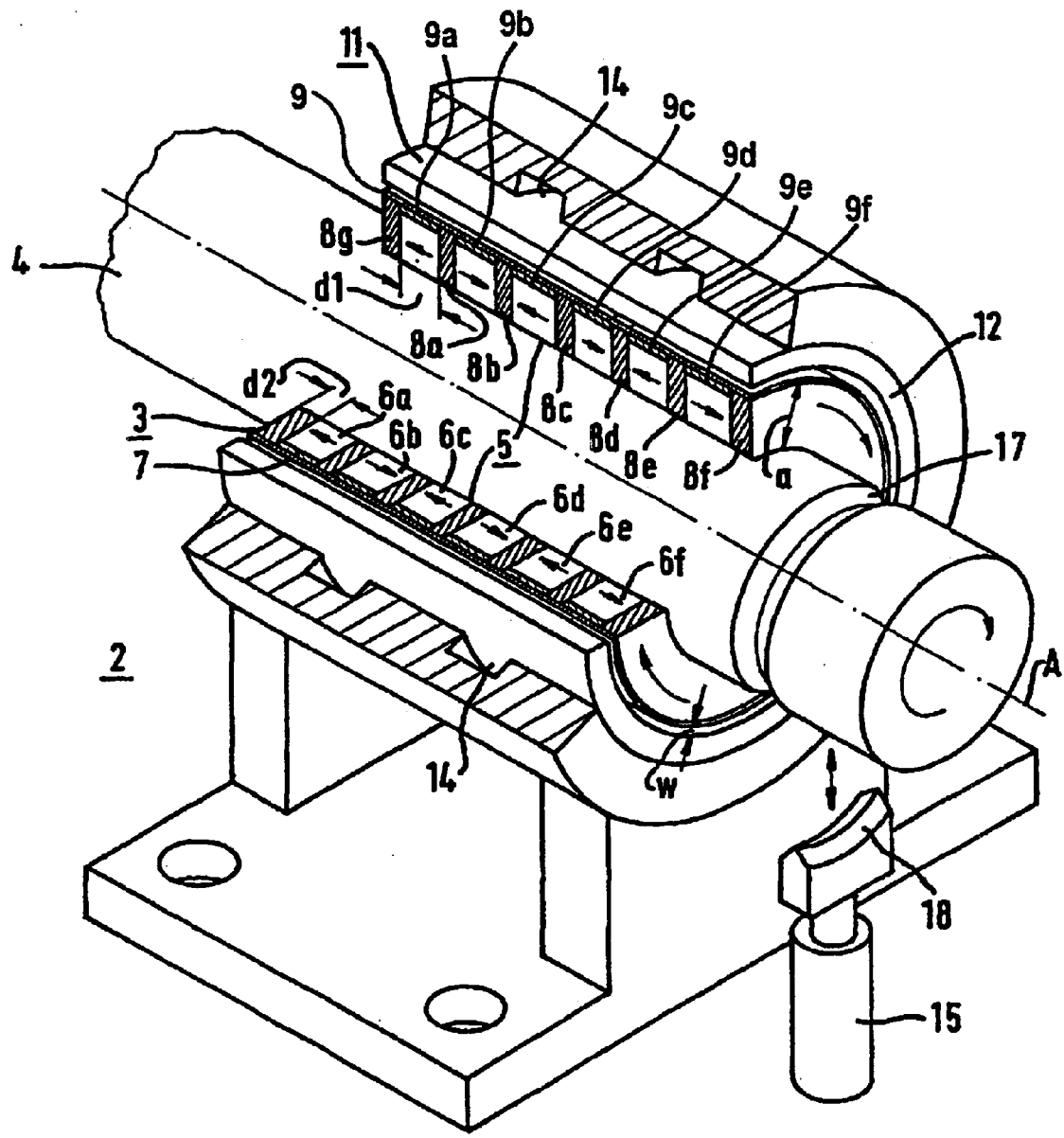

Parts corresponding to one another are provided with the same reference numerals in FIGS. 1 and 2.

In the case of the magnetic bearing shown in FIG. 1 and denoted by 2, for a rotating shaft 4 as a rotor, an inner bearing part, connected to the rotating shaft 4, is denoted by 5, a rotor body, formed by an inner bearing part 5 and a shaft 4, is denoted by 3 and an outer bearing part is denoted by 11.

The inner bearing part 5 is provided with a number, for example six, of annular disk-shaped permanent-magnetic elements (permanent magnets) 6a to 6f. These permanent-magnetic elements 6a to 6f are respectively polarized in such a way that axially, that is to say seen in the direction of the shaft axis A, the polarization is opposite from element to element. The individual directions of polarization are indicated in FIG. 1 by arrowed lines 7.

Arranged between the permanent-magnetic elements 6a to 6f are annular disk-shaped elements (intermediate elements) 8a to 8e of a ferromagnetic material, such as iron for example. Furthermore, ferromagnetic elements 8f and 8g, corresponding to the elements 8a to 8e, are provided on the end outer faces of the outer permanent-magnetic elements 6a to 6f. The ferromagnetic material of these ferromagnetic elements 8a to 8g serves for concentrating the magnetic flux at the cylindrical outer face of the inner bearing part 5 and, as a result, increases the supporting force of the bearing 2. At the same time, the ferromagnetic elements 8a to 8g also mechanically reinforce the inner bearing part 5 with the permanent-magnetic elements 6a to 6f, which generally are formed of brittle material. The ferromagnetic elements 8a to 8g consequently have, on the one hand, the function of flux guiding elements to guide the magnetic flux and, on the other hand, the function of axial holding elements.

All the elements 6a to 6f and 8a to 8g are fastened axially one behind the other on the shaft 4 in the form of a stack. The shaft 4 advantageously is formed of a non-magnetic or non-magnetizable material, such as a special steel for example. The stack of permanent-magnetic elements may, however, also be provided on a tubular support body of unmagnetic material, which for its part encloses a possibly even ferromagnetic shaft part. The wall thickness of this support body, then representing a hollow-cylindrical outer region of the shaft 4, should in this case be at least half the axial thickness of the magnet poles, i.e. (d1+d2)/2. Generally, however, the entire rotor shaft 4 is formed of the non-magnetic material.

The outer contour of the ferromagnetic elements 8a to 8g and possibly that of the permanent-magnetic elements 6a to 6f is brought into a uniform cylindrical shape after the stacking and fixing, brought about for example by an adhesive bonding technique, for example by looping or turning. The ferromagnetic material of the elements 8a to 8g has the effect that the magnetic field becomes rotationally symmetrical, at the same time compensating for inhomogeneities in the field of the permanent-magnetic elements 6a to 6f.

The radial expanse a of the annular disk-shaped permanent-magnetic elements 6a to 6f should advantageously be at least twice their thickness d1 in the axial direction. By contrast, the axial thickness d2 of each of the ferromagnetic elements 8a to 8g is advantageously chosen to be less than the axial thickness d1 of the permanent-magnetic elements 6a to 6f; for example, the thickness d2 is one to two tenths of the thickness d1.

The inner bearing part 5 is surrounded by a hollow-cylindrical, fixed-in-place outer bearing part 11, separated by a bearing gap 10. The gap width (radial dimension) w of the bearing gap 10 between the inner bearing part 5 and the outer bearing part 11 is preferably of the order of magnitude of the axial thickness d2 of the ferromagnetic intermediate elements 8a to 8g. Typical values for the gap width w and the axial thickness d2 lie between 0.1 mm and 5 mm, preferably between 0.3 mm and 1.5 mm.

The outer bearing part 11, forming a stator, has on its inner side facing the inner bearing part 5 a superconducting structure 12, preferably of one of the known high-temperature superconductor materials (high-$T_c$ superconductor materials), which allow a liquid-nitrogen ($LN_2$) cooling technique.

Textured $YBa_2Cu_3O_{7-x}$ comes into consideration in particular as a superconductor material for the superconductor structure 12. In this case, the crystalline a-b planes of at least a large part of the superconductor material are advantageously aligned substantially parallel to the outer face of the inner bearing part 5. Finely distributed depositions of $Y_2BaCuO_5$ may be advantageously present in the superconductor material. A corresponding material can be produced for example by what is known as the quench-melt-growth method (cf. Superconductor Science Technology, Vol. 5, 1992, pages 185 to 203) and should have at 77 K a critical current density of several $10^4$ A/$cm^2$. The average grain size (grain diameter) of the crystallites (grains) of the superconductor should in this case be greater than the axial thickness d1 of the permanent-magnetic elements 6a to 6f, considering the grain size in the crystalline a-b planes.

The magnetic flux induced by neighboring permanent-magnetic elements (for example 6d, 6e) on the inner bearing part 5 is largely concentrated in the common ferromagnetic intermediate element (8d) and so emerges with a high flux density via this intermediate element into the bearing gap 10. In the bearing gap 10, the flux closes on itself in the direction of respectively neighboring intermediate elements (8c and 8e, respectively). In the superconducting structure 12 which encloses the inner bearing part 5, bounds the bearing gap 10 and is fixed in place, the magnetic flux generated by the individual magnet poles induces corresponding currents, which in turn bring about a magnetic coupling or counter-coupling.

On the side of the rotor shaft 4, the magnetic flux closes on itself in the region of the non-magnetic material of the shaft 4. Consequently, a magnetic short circuit, which would lead to a reduction in the magnetic flux emerging into the bearing gap 10, is advantageously avoided there.

With respect to the configuration and further details of the materials, configurations, dimensions and function of the magnetic bearing, reference is also made to DE 44 36 831 C2, the content of which is incorporated in the disclosure of the present application.

The permanent-magnetic material of the elements 6a to 6f is to have a maximum energy product $(B*H)_{max}$ of at least 20 MGOe, in order to produce the required bearing forces and bearing stability. Suitable materials with such a high energy product are, in particular, a neodymium(Nd)-iron(Fe)-boron(B) alloy or a samarium(Sm)-cobalt(Co)alloy.

The maximum bearing pressure is not dictated by the superconductor material provided for the stator, but by the maximum achievable magnetic field H in the bearing gap 10. The relevant parameter for this is the coercive field strength $H_c$ of the permanent-magnetic material. Therefore, NdFeB comes into consideration in particular as the permanent-magnetic material, since it has a relatively high coercive field strength Hc. SmCo has with respect to room temperature at 77 K a 10% higher coercive field strength Hc, which then becomes comparable with that of NdFeB. Therefore, cooling of the permanent-magnetic material possibly also comes into consideration.

The stated alloys NdFeB and SmCo are generally produced powder-metallurgically from a powder, in particular pressed and subsequently annealed, hot-pressed or sintered. For example, the production methods described in Applied Physics Letters, Vol. 46 (8), Apr. 15, 1985, pages 790 and 791 and in Applied Physics Letters, Vol. 53 (4), Jul. 25, 1988, pages 342 and 343 may be used for producing the permanent magnets.

The moldings produced in this way for the permanent-magnetic elements $6a$ to $6f$ are brittle and can shed magnetic particles or even larger fragments under the effect of high forces, such as the high magnetic fields in the magnetic bearing and the centrifugal forces acting in the bearing, in particular on account of material fatigue or permanent loading. The problem of the brittleness of the permanent magnets is further exacerbated by the low temperatures in the magnetic bearing 2. The detached magnetic particles or larger pieces from the permanent-magnetic elements $6a$ to $6f$ may get into the bearing gap 10 and lead to considerable damage there, even total failure.

To prevent this, a radial holding device is provided according to the invention for the permanent-magnetic elements $6a$ to $6f$, holding the permanent-magnetic elements $6a$ to $6f$ together in the radial direction with respect to the axis of rotation or shaft axis A. Particularly critical are in this case the regions or sides of the permanent-magnetic elements $6a$ to $6f$ which are facing the bearing gap 10. For this purpose, the radial holding device may include flexible holding elements or else dimensionally stable holding elements.

In FIG. 1, each of the annular permanent-magnetic elements $6a$ to $6f$ is then wound or strapped with in each case an associated holding element $9a$ to $9f$ in one or more layers. Each holding element $9a$ to $9f$ is preferably shaped in the form of a flexible band (holding band) of a tear-resistant and tension-resistant material.

Expedient as the material for the holding elements (holding bands) $9a$ to $9f$ is a fiber composite material, a pure fiber material or some other stable banding material, for example a metal or metal alloy. Plastics or synthetic resins reinforced with fibers, in particular with carbon fibers and/or glass fibers, may be used in particular as fiber composite materials, and woven, knitted or pressed materials of fibers, preferably synthetic fibers or glass fibers or mineral fibers, in particular aramid, Kevlar, boron or similar materials, may be used in particular as fiber materials, the fibers being able in all cases to run unidirectionally or else at an angle to one another. The fiber composite material or fiber material may, in particular, be prestressed, in order to compensate for differences in thermal stress.

Each holding element $9a$ to $9f$ is strapped around the associated permanent-magnetic element $9a$ to $9f$ under a predetermined tensile stress and joined to itself at one or both ends in order to obtain a securement which is closed all around.

The radial thicknesses (expanses) of the permanent-magnetic elements $6a$ to $6f$ and of the holding elements $9a$ to $9f$ arranged radially on their outer side are generally chosen such that the sum of the radial thickness of the elements $6a$ to $6f$ and of the radial thicknesses of the holding elements $9a$ to $9f$ corresponds substantially to the radial thickness (expanse) a of the ferromagnetic elements $8a$ to $8f$ or is less than that, the radial thickness being measured as the distance between the inner face, facing the axis of rotation, and the outer face, facing correspondingly away. As a result, on the outer side of the inner bearing part 5, facing the bearing gap 10, again a uniform, substantially cylindrical surface is formed by the surfaces of the ferromagnetic elements $8a$ to $8f$ on the one hand and the holding elements $9a$ to $9f$ on the other hand. Furthermore, the holding elements $9a$ to $9f$ are laterally hindered from axial slipping by in each case two of the permanent-magnetic elements $8a$ to $8g$.

This formation with permanent-magnetic elements $6a$ to $6f$ radially set back inward (radially recessed) with respect to the ferromagnetic elements $8a$ to $8g$ on the outer side and in each case an associated holding element $9a$ to $9f$ has the advantage that the bearing force is reduced only insignificantly by the radial holding device (banding) with the holding elements $9a$ to $9f$. This is because the supporting force of the bearing 2 is generated mainly in the regions of high magnetic flux density and flux density gradient radially outside the ferromagnetic elements $8a$ to $8g$. However, the holding elements $9a$ to $9f$ provided only on the permanent-magnetic elements $6a$ to $6f$ influence the magnetic flux in and at the ferromagnetic elements $9a$ to $8g$ only slightly.

The radial thickness of the holding elements $9a$ to $9f$ is generally much less than the radial thickness of the associated permanent-magnetic elements $6a$ to $6f$ and is generally at most 33.3%, in particular at most 25% and preferably at most 10% of the radial thickness of the permanent-magnetic elements $6a$ to $6f$, in order not to reduce the supporting force of the bearing too much. The radial thickness of the holding elements $9a$ to $9f$ is preferably also less than the gap width w of the bearing gap 10. The values for the radial thickness of the holding elements $9a$ to $9f$ are generally chosen from a range between 0.1 mm and 4 mm, in particular between 0.2 mm and 3 mm and preferably between 0.3 mm and 1 mm.

The axial thickness (length) d1 of the permanent-magnetic elements $6a$ to $6f$ corresponds to the axial thickness (width) of the holding elements $9a$ to $9f$, so that the permanent-magnetic elements $6a$ to $6f$ are covered on their outer side, facing the bearing gap 10, completely by the holding elements $9a$ to $9f$ and cannot shed any particles into the bearing gap 10. Typically, the axial thickness dl of the permanent-magnetic elements $6a$ to $6f$, and consequently the axial thickness (width) of the holding elements $9a$ to $9f$, lies in a range between approximately 0.5 mm and approximately 5 mm, in particular between 1 mm and 4 mm.

The described banding by the band-shaped holding elements $9a$ to $9f$ has the effect that the permanent-magnetic elements $6a$ to $6f$, formed of brittle material, are effectively encapsulated with respect to the bearing gap 10 and can no longer shed magnetic particles into the bearing gap 10, so that the bearing 2 itself is effectively protected even in the case of shafts 4 running at high speed and the higher centrifugal forces occurring in that case.

The ferromagnetic elements $8a$ to $8e$ arranged between the permanent-magnetic elements $6a$ to $6f$ and also the further ferromagnetic elements $8f$ and $8g$ arranged on the axial outer side of the outer permanent-magnetic elements $6a$ to $6f$ are not banded in the embodiment shown in FIG. 1, that is to say have no holding element on their outer side. This is because the ferromagnetic elements $8a$ to $8g$ are generally more stable, even in the case of higher forces, than the permanent-magnetic elements $6a$ to $6f$, so that it is possible to dispense with securement against rupture or detachment of individual particles.

In addition to the holding elements 9a to 9f, which are intended only for the permanent-magnetic elements 6a to 6f, a holding element (holding band) 9 running over the entire inner bearing part 5, on its outer side, is provided in FIG. 2 for the additional securement both of the permanent-magnetic elements 6a to 6f with the holding elements 9a to 9f and of the ferromagnetic elements 8a to 8g. The outer banding by the holding element 9 should in this case be as thin as possible, in order not to reduce the supporting force of the bearing 2 too much. The radial thickness of the holding element 9 should therefore not exceed the radial thickness of the holding elements 9a to 9f.

As a modification of the embodiments shown in FIGS. 1 and 2, a banding of the individual permanent-magnetic elements 6a to 6f, which also surrounds the elements on the inner side, may also be provided. In this embodiment, the permanent-magnetic elements 6a to 6f are wrapped completely in a band and generally only then mounted on the inner bearing part 5.

Instead of a banding with flexible holding bands, the radial holding device may also include dimensionally stable encapsulations or sheathings of the permanent-magnetic elements 6a to 6f. For example, hollow-cylindrical or annular holding bodies, pushed or placed on from the outside, may be used, or the elements may be embedded in a sheathing or be encapsulated in it by casting or injection-molding.

As FIG. 1 or FIG. 2 further reveals, the superconducting material on the outer side of the structure 12 is cooled with liquid nitrogen ($LN_2$) from an external reservoir by cooling channels 14 in the support body 13.

Outside the region of the inner bearing part 5, the magnetic bearing 2 has a lowerable holding and centering device 15, which absorbs the bearing force at a standstill until the superconducting material is above its operating temperature. This device raises the shaft 4 until the inner bearing part 5 almost or completely touches the superconducting structure 12 at an upper vertex point. At the same time, the bearing position is centered axially and laterally. As FIG. 1 reveals, this centering may take place for example by a groove 17 in the shaft 4 and a ridge-shaped rest 18 on the device 15. After cooling down, the device 15 lowers the shaft 4. As a result of the associated change in the field in the superconductor material, currents are induced in it. This produces an increasing electromagnetic force between the inner bearing part 5 and the outer bearing part 11 (stator) surrounding it, which opposes the direction of movement, until the inner bearing part 5 and the shaft 4 swing freely approximately in the middle of the bearing gap 10. In this case, the magnetic forces in the lower bearing region have a repelling effect, while attracting forces in the upper bearing region are cumulative. With this bearing, bearing pressures of up to 10 bar and a considerable rigidity of the bearing against displacement of the rotor in the radial and axial directions can be achieved.

As an alternative to the exemplary embodiments shown in FIGS. 1 and 2, in an embodiment not represented the magnetic bearing may have permanent-magnetic elements in the form of hollow cylinder segments arranged adjacent to one another in the circumferential direction around the axis of rotation A and of alternating polarity, when seen in the circumferential direction, and ferromagnetic elements running in between. These elements are then joined together in the form of axial-parallel strips to create a hollow cylinder shape around the shaft 4. Such a bearing acts as a radial bearing and at the same time as a contact-free magnetic coupling, i.e. an axial torque can be transferred at the same time. As an example, a rotor with a superconducting winding is possible with such a bearing on the drive side and a radial bearing, as described above, on the opposite side, which rotates completely free from contact in a stator.

In the case of the embodiments shown in FIGS. 1 to 2 of bearings 2 and 20 according to the invention, it was assumed that in each case the hot rotating (inner) bearing part is surrounded by a fixed cold (outer) bearing part as a stator. However, it is equally also possible to allow the cold bearing part with the high-$T_c$ superconductor material to co-rotate and form the hot bearing part with the permanent-magnetic material as the stator. In the case of this embodiment, the rotor shaft 34 of non-magnetic material may at the same time have at least one coolant channel, in particular a central coolant channel. Corresponding bearings with a cold rotor body may advantageously be part of a generator or motor rotor with a winding of high-$T_c$ superconductor material, the shaft also being at a lower temperature. As a result of the freedom from contact, there is no need for heat to be introduced via the shaft.

The banding or securement according to the invention is not confined to magnetic bearings with superconductors as coupling means interacting with the permanent magnets, but can also be used in the case of conventional magnetic bearings with electromagnets or permanent magnets as coupling means, in particular in the case of the magnetic bearings known from the publications mentioned at the beginning. Furthermore, a holding device according to the invention for the brittle permanent magnets is also conceivable in principle in the case of magnetic bearings which do not rotate or do not just rotate, for example in the case of linear magnetic bearings for translatory movements.

The invention has been described in detail with particular reference to preferred embodiments thereof and examples, but it will be understood that variations and modifications can be effected within the spirit and scope of the invention.

What is claimed is:

1. A magnetic bearing comprising:

at least one inner bearing part;

at least one outer bearing part substantially surrounding said at least one inner bearing part, said at least one inner and outer bearing parts rotatable relative to each other about an axis of rotation;

a plurality of permanent magnets arranged axially one behind another in relation to the axis of rotation;

a plurality of flux guiding elements arranged axially in relation to the axis of rotation between at least two adjacent permanent magnets and substantially filling an interspace between the at least two adjacent permanent magnets to guide a magnetic flux of said permanent magnets on a first one of said inner and outer bearing parts;

at least one coupling means on a second one of said inner and outer bearing parts for interacting with said permanent magnets to form a bearing gap around the axis of rotation;

radial holding elements, each formed by a non-magnetic material and associated with a corresponding permanent magnet, to hold the corresponding permanent magnet, on a side facing the bearing gap, each permanent magnet being set back radially with respect to at least one corresponding flux guiding element of the plurality of flux guiding element, in a radial direction; and a common radial holding element extending over the radial holding elements, each associated with said corresponding permanent magnet, and over said flux guiding elements.

2. The magnetic bearing as claimed in claim 1, wherein said common radial holding element comprises a holding band.

3. The magnetic bearing as claimed in claim 1, wherein a radial expanse of the common radial holding element is less than a radial expanse of each of the holding elements.

4. A magnetic bearing, comprising:

at least one inner bearing part;

at least one outer bearing part substantially surrounding said at least one inner bearing part, said at least one inner and outer bearing parts rotatable relative to each other about an axis of rotation;

a plurality of permanent magnets arranged axially one behind another in relation to the axis of rotation;

a plurality of flux guiding elements arranged axially in relation to the axis of rotation between at least two adjacent permanent magnets and substantially filling an interspace between the at least two adjacent permanent magnets to guide a magnetic flux of said permanent magnets on a first one of said inner and outer bearing parts;

at least one coupling means on a second one of said inner and outer bearing parts for interacting with said permanent magnets to form a bearing gap around the axis of rotation; and radial holding elements, each formed by a non-magnetic material and associated with a corresponding permanent magnet, to hold the corresponding permanent magnet, on a side facing the bearing gap, each permanent magnet being set back radially with respect to at least one corresponding flux guiding element of the plurality of flux guiding element, in a radial direction, wherein said flux guiding elements include at least one external flux guiding element respectively arranged outside each outermost permanent magnet in relation to the axis of rotation.

5. A magnetic bearing, comprising:

at least one inner bearing part;

at least one outer bearing part substantially surrounding said at least one inner bearing part, said at least one inner and outer bearing parts rotatable relative to each other about an axis of rotation;

at least one permanent magnet;

at least one flux guiding element arranged axially in relation to the axis of rotation adjacent to said at least one permanent magnet to guide magnetic flux of said at least one permanent magnet on a first one of said inner and outer bearing parts;

at least one coupling means on a second one of said inner and outer bearing parts and interacting with said at least one permanent magnet to form a bearing gap around the axis of rotation between;

at least one radial holding element associated with a corresponding permanent magnet, to hold the corresponding permanent magnet on a side facing the bearing gap, the permanent magnet being set back radially with respect to said at least one flux guiding element in a radial direction; and a common radial holding element extending over the at least one radial holding element associated with the corresponding permanent magnet, and over the at least one flux guiding element.

* * * * *